United States Patent [19]
Suzuki et al.

[11] Patent Number: 5,254,899
[45] Date of Patent: Oct. 19, 1993

[54] MICRO-TRAVELLER WITH ULTRASONIC MOTOR

[75] Inventors: Makoto Suzuki; Nobuo Tsukada; Ichiro Horikoshi; Fujio Ozawa; Masao Kasuga, all of Tokyo, Japan

[73] Assignee: Seiko Instruments Inc., Japan

[21] Appl. No.: 824,014

[22] Filed: Jan. 22, 1992

[30] Foreign Application Priority Data

Sep. 17, 1991 [JP] Japan .................. 3-236650

[51] Int. Cl.⁵ .................. H01L 41/08; B61B 13/10
[52] U.S. Cl. .................. 310/323; 104/138.2
[58] Field of Search .................. 378/60; 73/623; 358/100; 104/138.2; 310/323

[56] References Cited

U.S. PATENT DOCUMENTS

| | | | |
|---|---|---|---|
| 3,018,086 | 1/1962 | Raney | 104/138.2 |
| 4,006,359 | 2/1977 | Sullins et al. | 104/138.2 |
| 4,194,218 | 3/1980 | Hasegawa | 358/100 |
| 4,560,931 | 12/1985 | Murakami et al. | 73/623 |
| 4,722,001 | 1/1988 | Röhrich et al. | 358/100 |
| 4,770,105 | 9/1988 | Takagi et al. | 104/138.2 |
| 4,862,808 | 9/1989 | Hedgcoxe et al. | 378/60 |
| 4,935,659 | 6/1990 | Naka et al. | 310/323 |
| 4,937,488 | 6/1990 | Fujie et al. | 310/323 |
| 5,008,581 | 4/1991 | Kumada et al. | 310/323 |

FOREIGN PATENT DOCUMENTS

| | | | |
|---|---|---|---|
| 3236947 | 4/1984 | Fed. Rep. of Germany | 104/138.2 |
| 0213476 | 9/1988 | Japan | 310/323 |
| 0262069 | 10/1988 | Japan | 310/323 |
| 0117669 | 5/1989 | Japan | 310/323 |
| 0162153 | 6/1990 | Japan | 104/138.2 |
| 2128842 | 5/1984 | United Kingdom | 358/100 |

Primary Examiner—Steven L. Stephan
Assistant Examiner—C. LaBalle
Attorney, Agent, or Firm—Bruce L. Adams; Van C. Wilks

[57] ABSTRACT

A traveller having two ultrasonic motors, each of which movable member drives the driving wheel respectively. The ultrasonic motor comprises a vibrating member, a moving member and a pressure regulating member. The driving circuit sends signals to turn the ultrasonic motor, which turn the moving memeber to turn the driving wheel. With the driving wheel turning, the traveller travels freely in any direction. Each of two ultrasonic motors receives respective signals to travel freely in any direction as a effect.

33 Claims, 17 Drawing Sheets

MICRO-TRAVELLER WITH ULTRASONIC MOTOR

BACKGROUND OF THE INVENTION

This invention relates to a compact size travelling mechanism utilizing ultrasonic wave motor so as to travel into places as narrow as where human hands cannot enter, such as a small and narrow pipe.

As shown in FIG. 4 a sectional view and FIG. 5 a front view of a known electro-magnetic type travelling mechanism, a certain voltage from a driving circuit (not shown in thee drawings) is applied to a coil 53, whereby, a coil core 50 is magnetized, and then a tip of the coil core 50a was attracted and repelled to a permanent magnet 51, thereby generating a vibration. By applying this generated vibration to a slanted brush 52 attached to the lower face of the permanent magnet 51, the mechanism can be advanced in a certain direction. FIG. 5 shows a front view that the equipment has two parts, a left-hand as described above and a right-hand part comprised of a coil core center 150, a permanent magnet 151, a slanted brush 152, and a coil 153, which are structured the same as the left-hand part. The two parts are connected in parallel. By controlling the two parts, respectively, the mechanism can change directions.

FIG. 6 and FIG. 7 shows a sectional side view and a front view of a conventional travelling mechanism. A plurality of blades 61 are attached to a shaft 64. A box 60 enclosing the blades 61 is attached to the shaft 64. Driving wheels 63 and 163 are attached to each of the shaft ends 64a exposed from the box 60. From a pipe 62 attached to the box 60, air can be sent to turn the blades 61. Through the shaft 64, a turning force is transmitted to the driving wheels 63 and 163 to advance the mechanism in a certain direction.

An ultrasonic motor is disclosed in U.S. Pat. Nos. 4,533,219 (Katsuma et al), 4,562,374 (Sashida) and 5,006,746 (Kasuga et al).

Known travelling mechanisms had such problems that the coil could not be manufactured any smaller, and that the coil became overheated and damaged by excessive current, or the mechanisms could not be controlled as to their direction of travel.

SUMMARY OF THE INVENTION

The objective of the present invention is to solve those problems and to make a compact travelling mechanism without using a coil.

In order to solve the above problems, the present invention employs two ultrasonic motors in parallel, the motors being controlled independently and neither carrying a coil.

Each ultrasonic motor comprises a vibrating member, a moving member and a pressure regulating member. A driving circuit sends signals to turn the ultrasonic motor, which signals turn the moving member to turn the driving wheel. With the driving wheel turning, the traveller travels freely in any direction. Each of the two ultrasonic motors receives respective signals to travel freely in any direction.

DETAILED DESCRIPTION OF THE PREFERRED EMBODIMENTS

Figure 1:
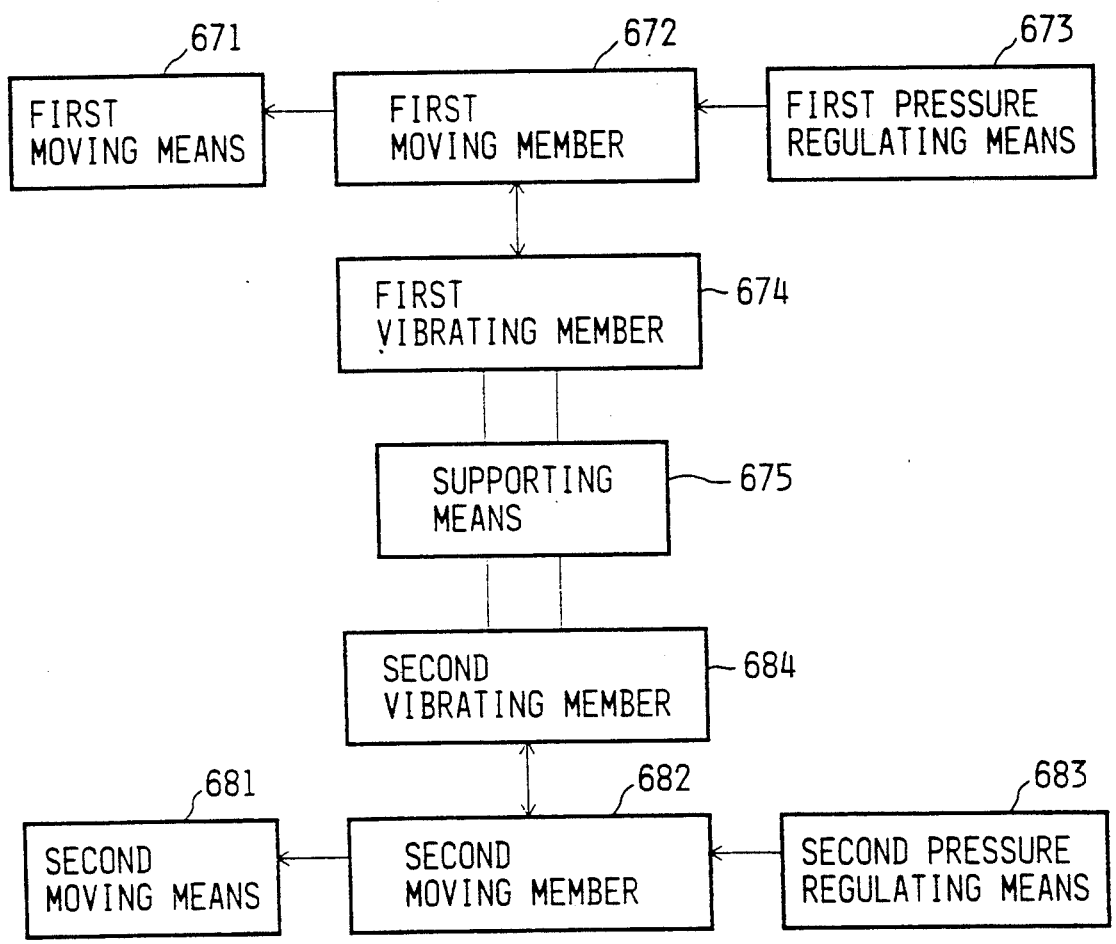
FIG. 1 is a diagram of a compact travelling mechanism according to the present invention.

Hereinafter, the first embodiment will be described based on the drawings. FIG. 1 is a diagram of the present invention, a compact travelling mechanism. A first vibrating member 674 is incorporated into a supporting means 675. A first moving member 672 is applied pressure by a first pressure regulating means 673 and is supported by the first vibrating member 674. Vibration generated by the first vibrating member 674 is transmitted to advance the moving member 672. Movement of the first moving member 672 is transmitted to a first moving means 671. Movement of the first moving means 671 enables movement of the compact travelling mechanism.

Similarly, a second vibrating member 684 is incorporated to the supporting means 675. A second moving member 682, a second pressure regulating means 683 and a second moving means 681 operate in the same way as the first structure to advance the compact travelling mechanism.

Figure 2:
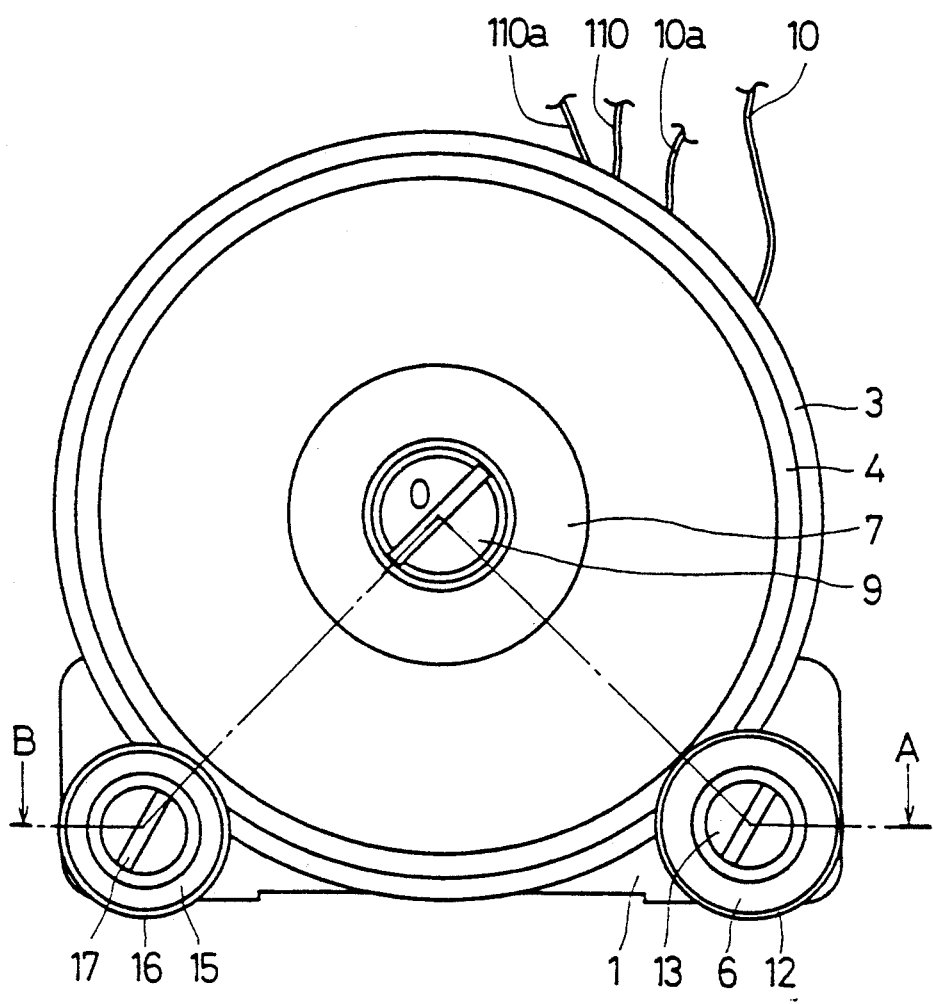
FIG. 2 is a side view of the first embodiment of a compact travelling mechanism of the present invention.
Figure 3:
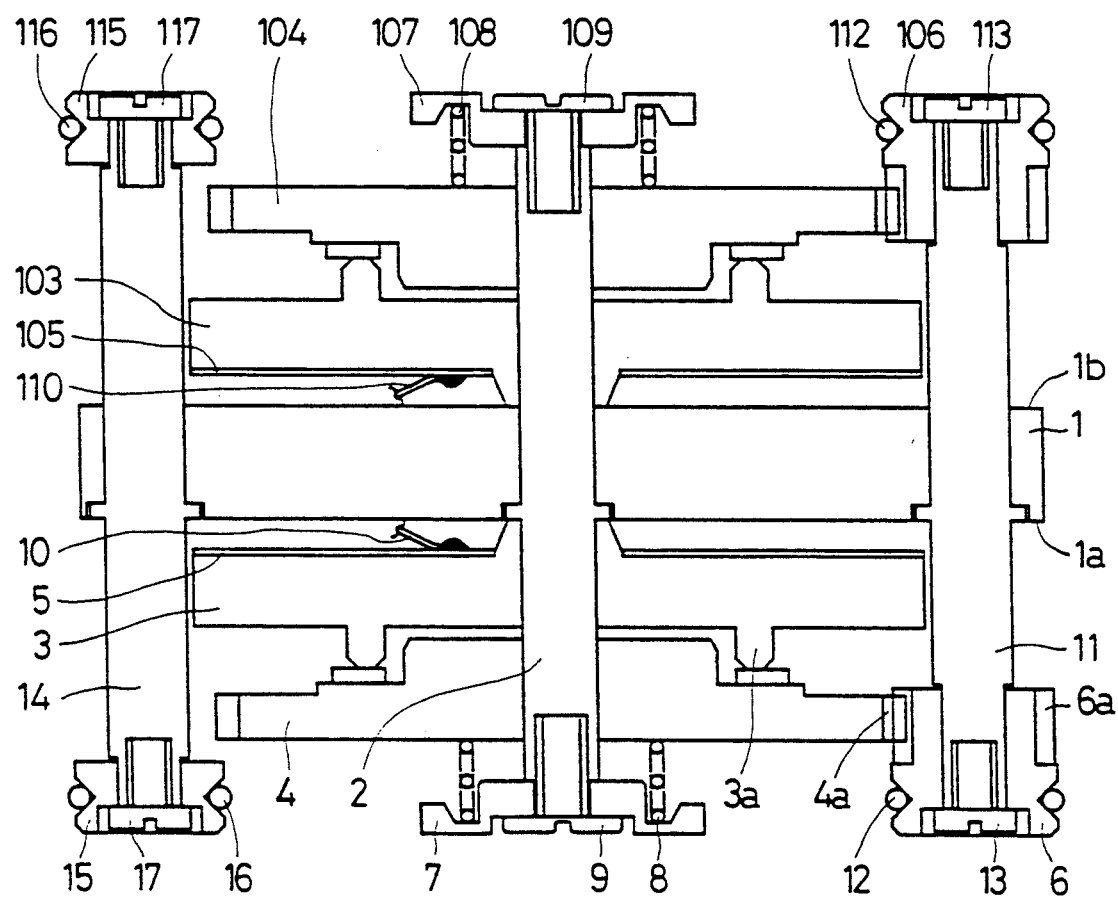
FIG. 3 is a view sectioned along the lines III—III—III of FIG. 2 of the first embodiment of a compact travelling mechanism of the present invention.
Figure 4:
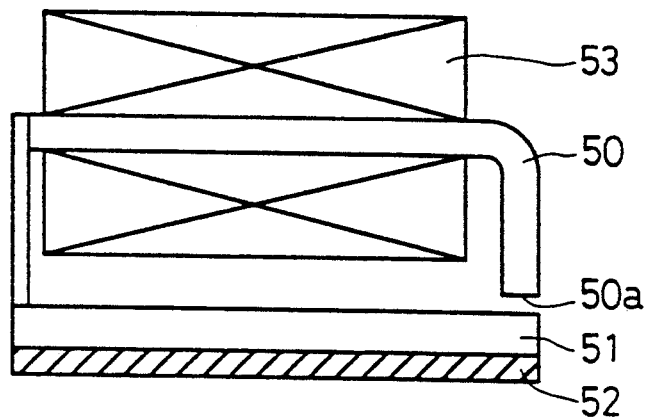
FIG. 4 is a sectional view of a prior art compact travelling mechanism.
Figure 5:
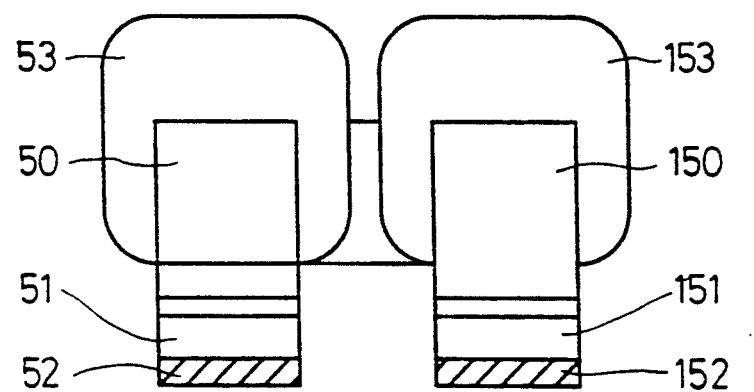
FIG. 5 is a front view of a prior art compact travelling mechanism.
Figure 6:
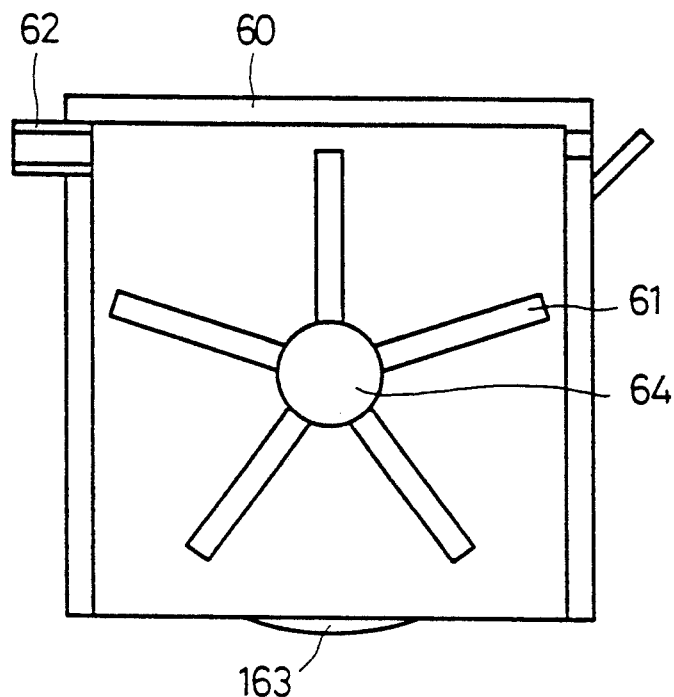
FIG. 6 is a sectional side view of a prior art compact travelling mechanism.
Figure 7:
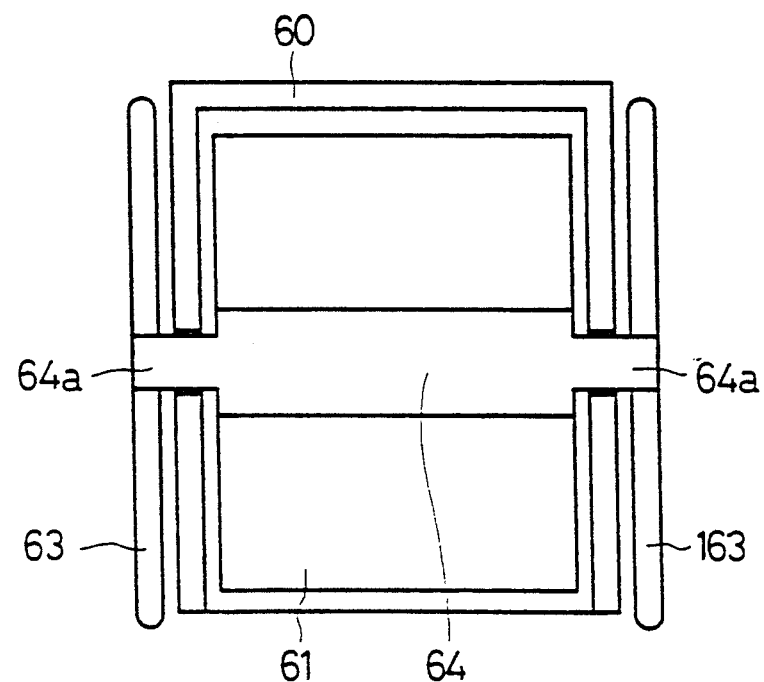
FIG. 7 is a front view of a prior art compact travelling mechanism.

As shown in FIG. 2 a side view and FIG. 3 a view sectioned along the lines III—III—III of FIG. 2, a motor axle 2, a driving axle 11, and a guide axle 14 are fixed on a vibrating member frame or supporting plate. The supporting plate or frame 1 has a front end (left end in FIGS. 2 and 3) and a rear end (right end in FIGS. 2 and 3) and has an imaginary front-to-rear center line dividing the plate or frame 1 into two opposite sides. On the side 1a of the first face of the vibratory member supporting plate, a vibrating or vibratory member 3 fitted with the motor axle 2 and a piezoelectric element 5, is fixed. A moving member 4 contacts the vibrating member 3 closely enough for the moving member 4 to be able to turn, supported by the motor axle 2. A coil spring 8 guided by the motor axis 2 is inserted between the moving member 4 and a hook 7. The hook 7 is fixed on the motor axle by a hook screw 9. The driving axle 11 turnably supports a driving wheel 6 equipped with a driving wheel rubber 12 and is fitted with a driving wheel screw 13 for securing a driving wheel. Instead of the driving wheel rubber, a chain belt or a plurality of tires may be used. A gear 6a of the driving wheel 6 meshes with a gear 4a of the moving member 4. A guide axle 14 supports a guide wheel 15 equipped with a guide wheel rubber 16, which can rotate. A guide wheel screw 17 is fitted with the guide axle 14.

On the side 1b of the second face of the vibrating member supporting plate 1, a vibrating or vibratory member 103 having piezoelectric element 105 adhered, is fitted. A moving member 104, a coil spring 108, a hook 107, a hook screw 109, a driving wheel 106 equipped with a guide wheel rubber 112, a driving wheel screw 113, a guide wheel 115 equipped with a guide wheel rubber 166, the guide wheel screw 117, all of which are supported on motor axle 2, a driving axle 11 and a guide axle 14, are structured the same as those structured on the side 1a of the first face.

On the first side 1a of the vibrating member supporting plate 1, the piezoelectric element 5 having electrode patterns according to a prescribed polarization processing, is fixed. Through a lead wire 10 and a lead wire 10a connected to the piezoelectric element 5, from a driving circuit (not shown), a certain voltage is applied to the piezoelectric element 5, which causes the vibrating member 3 to transform, and which causes the comb-like projections 3a to transform, thereby turning the moving member 4 at a certain speed. The gear 4a of the moving member 4 engages with the gear 6a of the driving wheel 6, so that the turning force is transmitted to the moving member 4, thereby moving the travelling mechanism.

When a frequency voltage having a different phase is applied to the electrode patterns of the piezoelectric element 5, the moving member 4 turns in a reverse direction and by its force being transmitted to the driving wheel 6, the travelling mechanism can move backwards. On the second side 1b of the vibrating member supporting plate 1 as well, through a lead wire 110 and 110a connected to the piezoelectric element 103, by applying a certain frequency voltage, the turning force is transmitted to the driving wheel 106. In order to move the travelling mechanism in different directions, ultrasonic motors attached to the first side 1a and the second side 1b of the vibrating member supporting plate 1 are respectively controlled to turn each wheel at a different speed.

Figure 8:
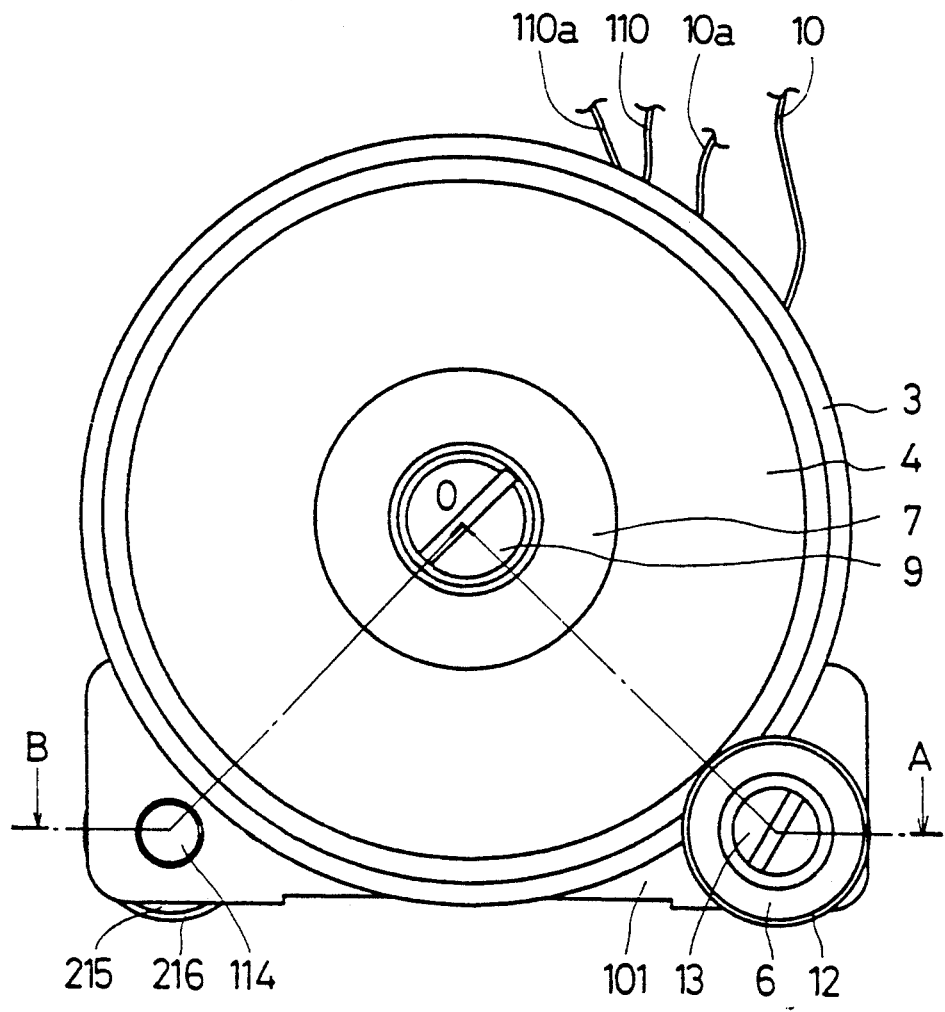
FIG. 8 is a side view of a second embodiment of a compact travelling mechanism according to the present invention.
Figure 9:
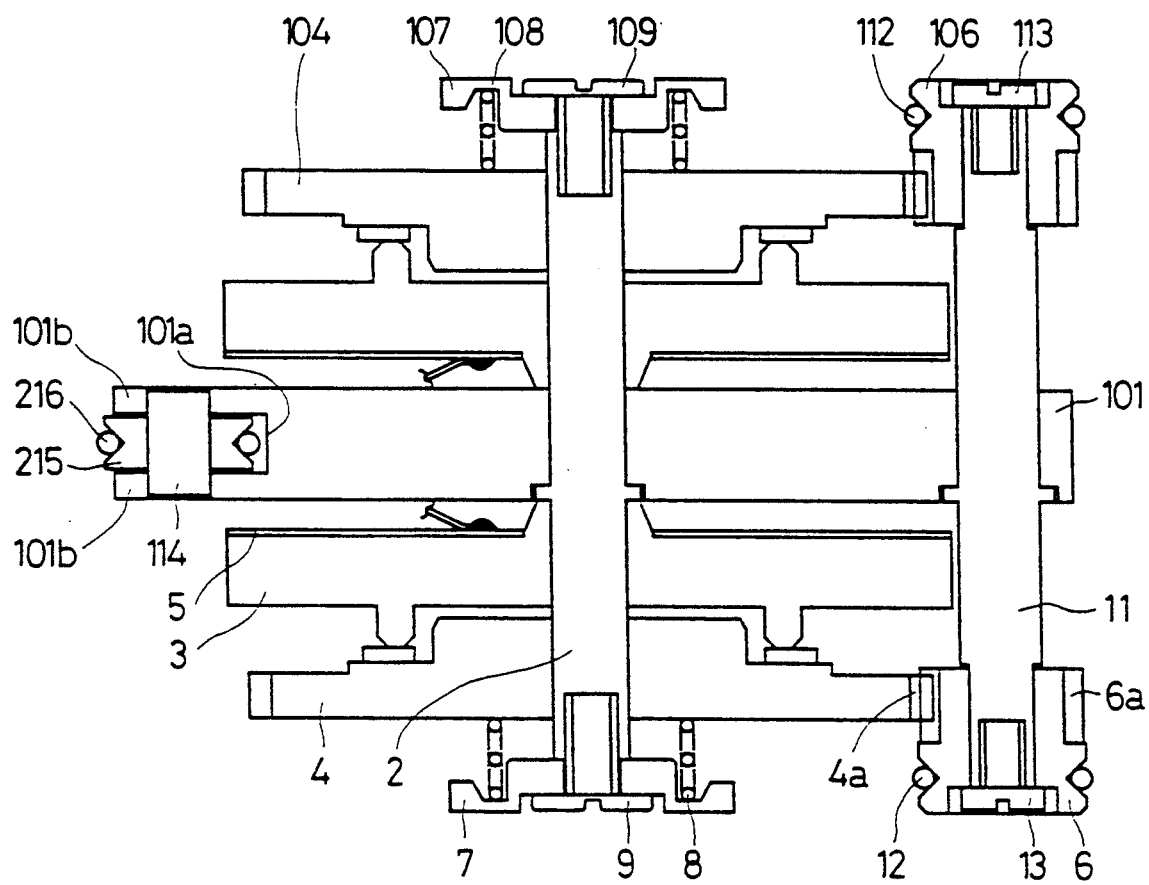
FIG. 9 is a view sectioned along the lines IX—IX—IX of the second embodiment of a compact travelling mechanism of the present invention.

In FIG. 8 a side view and FIG. 9 a view sectioned along the lines IX—IX—IX of FIG. 8, the second embodiment of the invention is shown. The principal difference between the first and the second embodiments is that the second embodiment has a single guide wheel 215 rather than two guide wheels as in the first embodiment. The guide wheel 215 has a guide wheel rubber 216 which is provided in a thread 101a of a vibrating member supporting plate 101 is supported for the guide wheel 215 to turn by a guide axle 114, and both ends of the guide axle 114, are fixed in a vibrating member supporting plate 101b. A supporting means for a vibrating member and a moving member and a means for applying pressure and a moving means are structured the same as the structure shown in FIG. 3 of the first embodiment. The structure of the second embodiment has only one guide wheel 215 and has three places of contact to the ground, which enables better ground contact.

Figure 10:
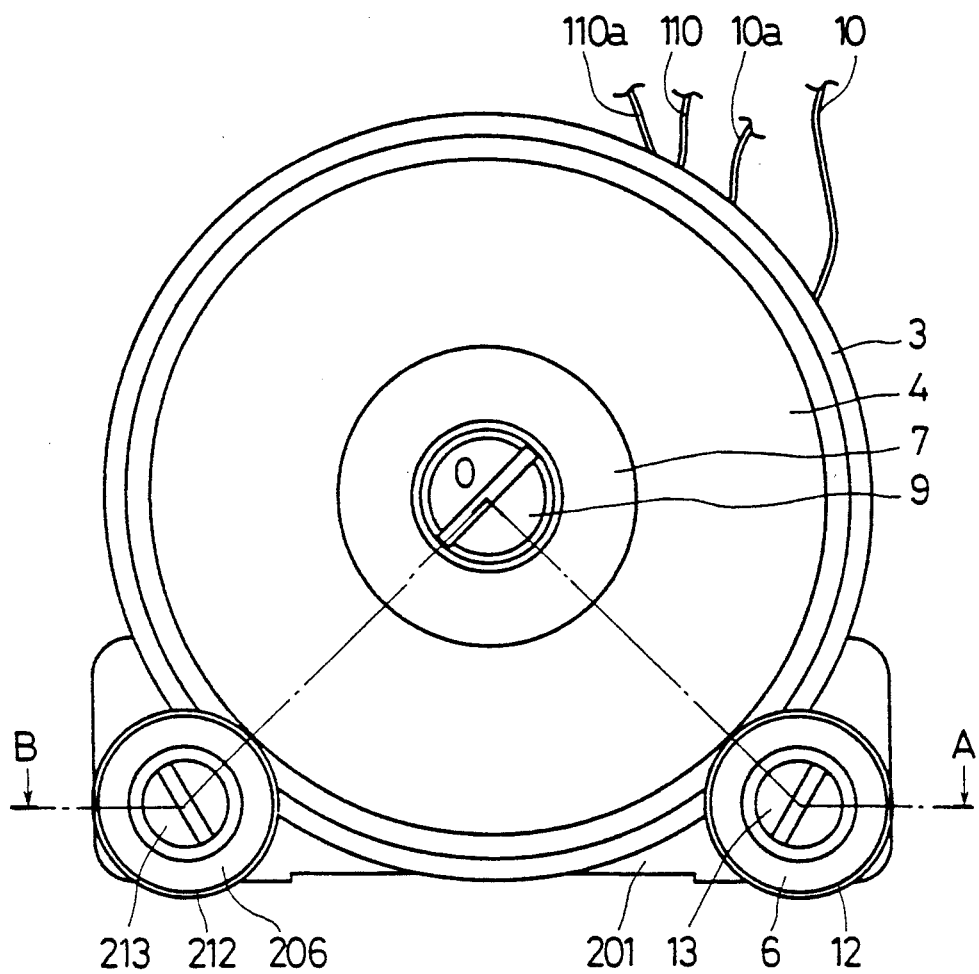
FIG. 10 is a side view of a third embodiment of a compact travelling mechanism according to the present invention.
Figure 11:
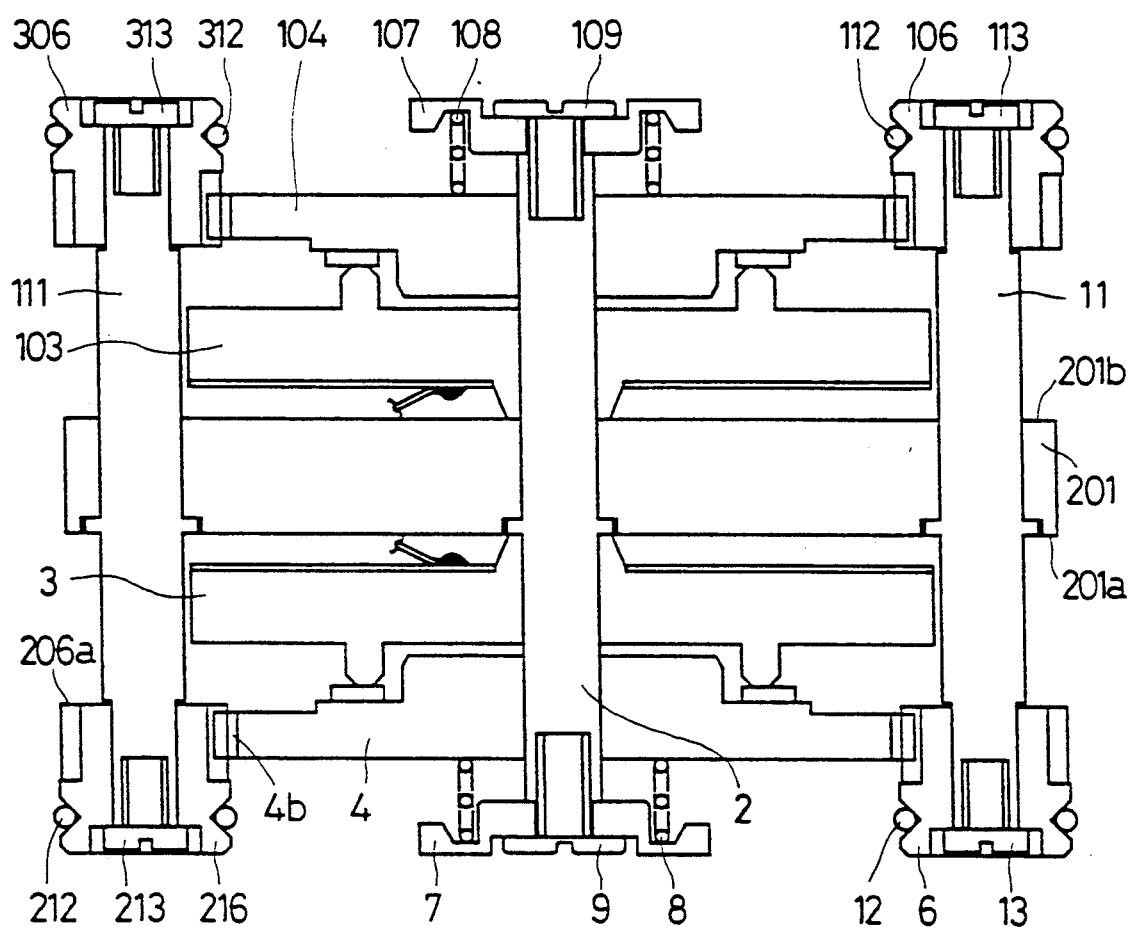
FIG. 11 is a view sectioned along the lines XI—XI—XI of the third embodiment of a compact travelling equipment to the present invention.

In FIG. 10 a side view and FIG. 11 a view sectioned along the lines XI—XI—XI of FIG. 10, the third embodiment of the invention is shown. The differences between the first and the third embodiments are the following. A driving axle 111 is fixed on a vibrating member supporting plate 201. On the first side 201a of the vibrating member supporting plate 201, a driving wheel 206 having a driving wheel rubber 212 is supported for the driving wheel 206 to turn by a driving axle 111. Here, gear 206a of the driving wheel 206 meshes with gear 4b of the moving member 4. On the second side 201b of a vibrating member supporting plate 201, there is a structure the same as that on the first side. A structure having a vibrating member, a supporting means and means to apply pressure of a moving member is the same as the structure shown in FIG. 3 of the first embodiment. The structure of the third embodiment enables four-wheel drive and enhances gradability, for example, even if one of the wheels is not in a good ground contact condition, it can move in a stable condition.

Figure 12:
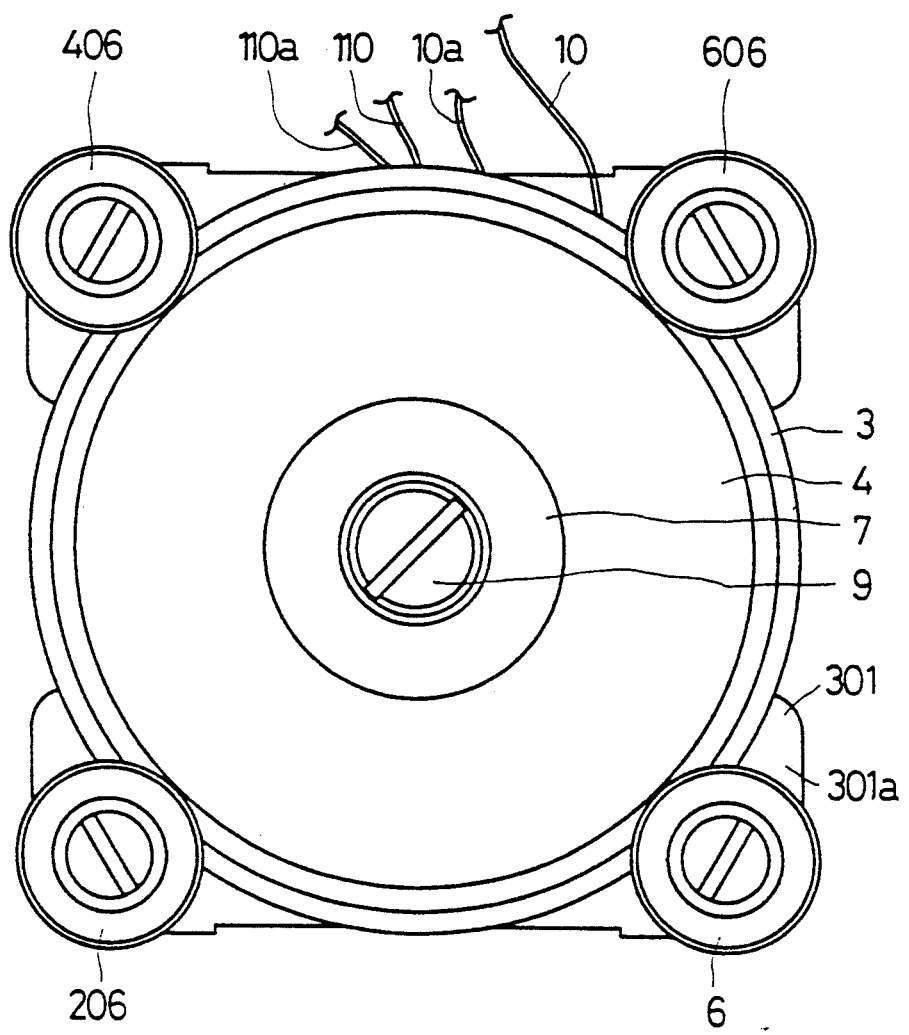
FIG. 12 is a side view of a fourth embodiment of a compact travelling mechanism according to the present invention.

In FIG. 12, the fourth embodiment of the invention is shown. A structure having a vibrating member, a supporting means for a vibrating member, means to apply pressure and a moving means is the same as the structure shown in FIG. 3 of the first embodiment. The differences between the first and the fourth embodiments are the following. Four driving axles, along the circumference of a moving member 4, are fixed on a vibrating member supporting plate 301. On the first side 301a of the vibrating member supporting plate 301, driving wheels 6, 206, 406, and 606 respectively, mesh with gear 4a of the moving member 4 and the wheels are supported, to turn by each axle. On the second side 301b, which is not show in the figure, of the vibrating member supporting plate 301, the structure is the same as that on the first side. The structure of the fourth embodiment enables eight-wheel drive and stable ground contact, since at least four of the eight wheels contact the ground for stable movement even if the mechanism falls forward or backward. For example, if the mechanism falls forwardly from the normal orientation shown in FIG. 12, the set of driving wheels 206, 406 (and the corresponding two on the side 301b) will contact the ground instead of the set of driving wheels 6, 206 (and the corresponding two on the side 301b) as shown in FIGS. 12.

Figure 13:
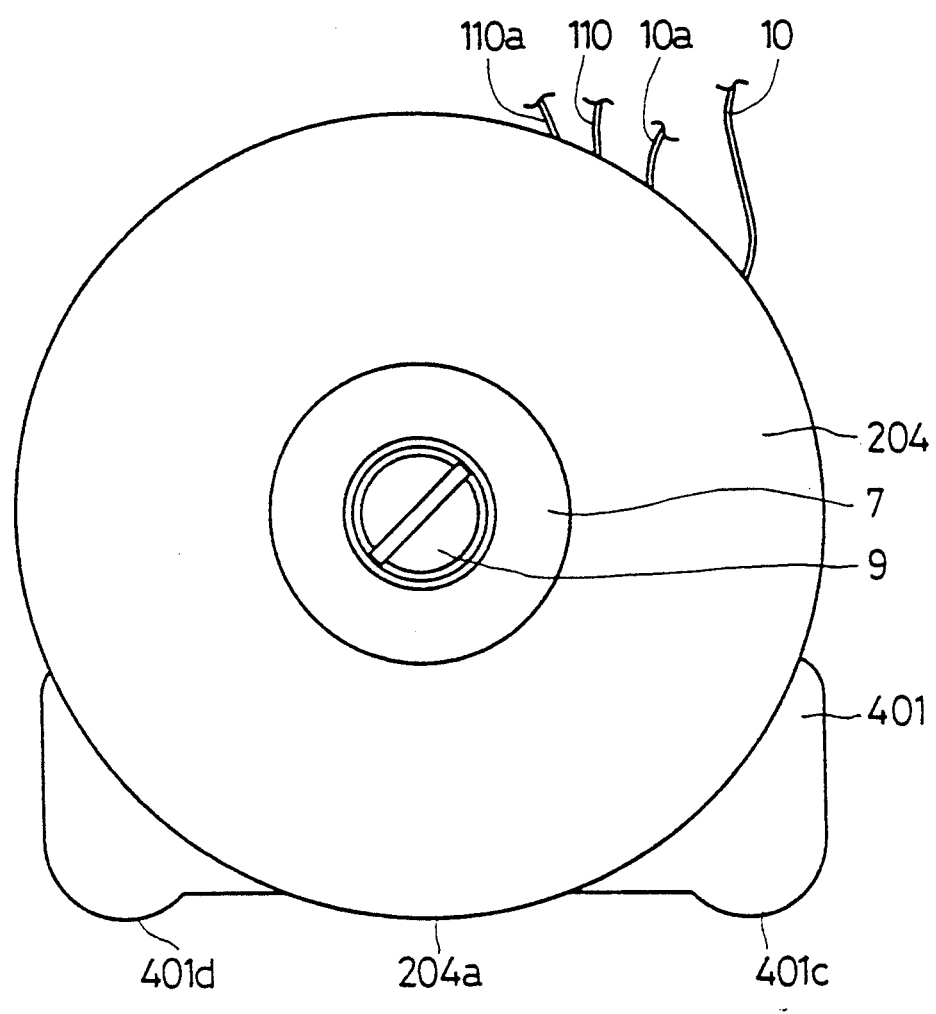
FIG. 13 is a side view of a fifth embodiment of a compact travelling mechanism according to the present invention.
Figure 14:
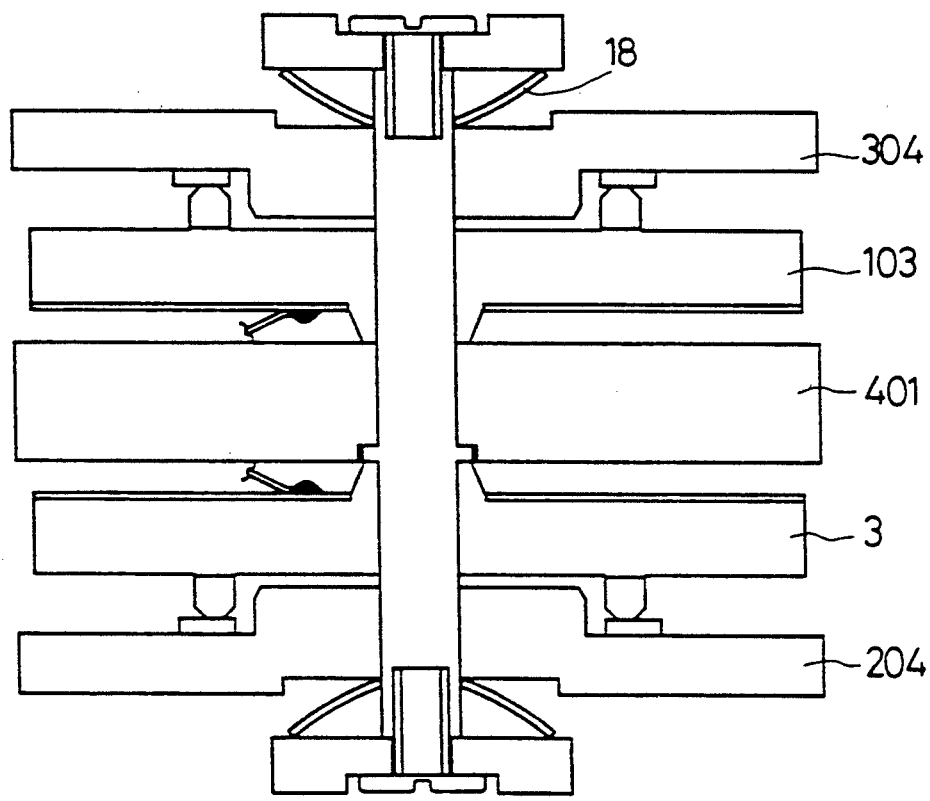
FIG. 14 is a sectional view of the fifth embodiment of a compact travelling mechanism according to the present invention.

In FIG. 13 a side view and FIG. 14 a sectional view, the fifth embodiment of the invention is shown. A structure having a vibrating member, a supporting means and means to apply pressure for a moving member is that same as the structure of the first embodiment shown in FIG. 3. The differences between the first and the fifth embodiments are the following. Some portion of circumference 204a of a moving member 204 contacts to the ground and the moving member itself functions as a moving means. In order to prevent the moving means 204 from falling toward a moving direction, protrusion parts 401c and 401d are provided on each side of a vibrating member supporting plate 401. In this way, the moving member 204 directly contacts the ground and can transmit turning force directly to the ground and thereby reduce losses of turning force.

Figure 15:
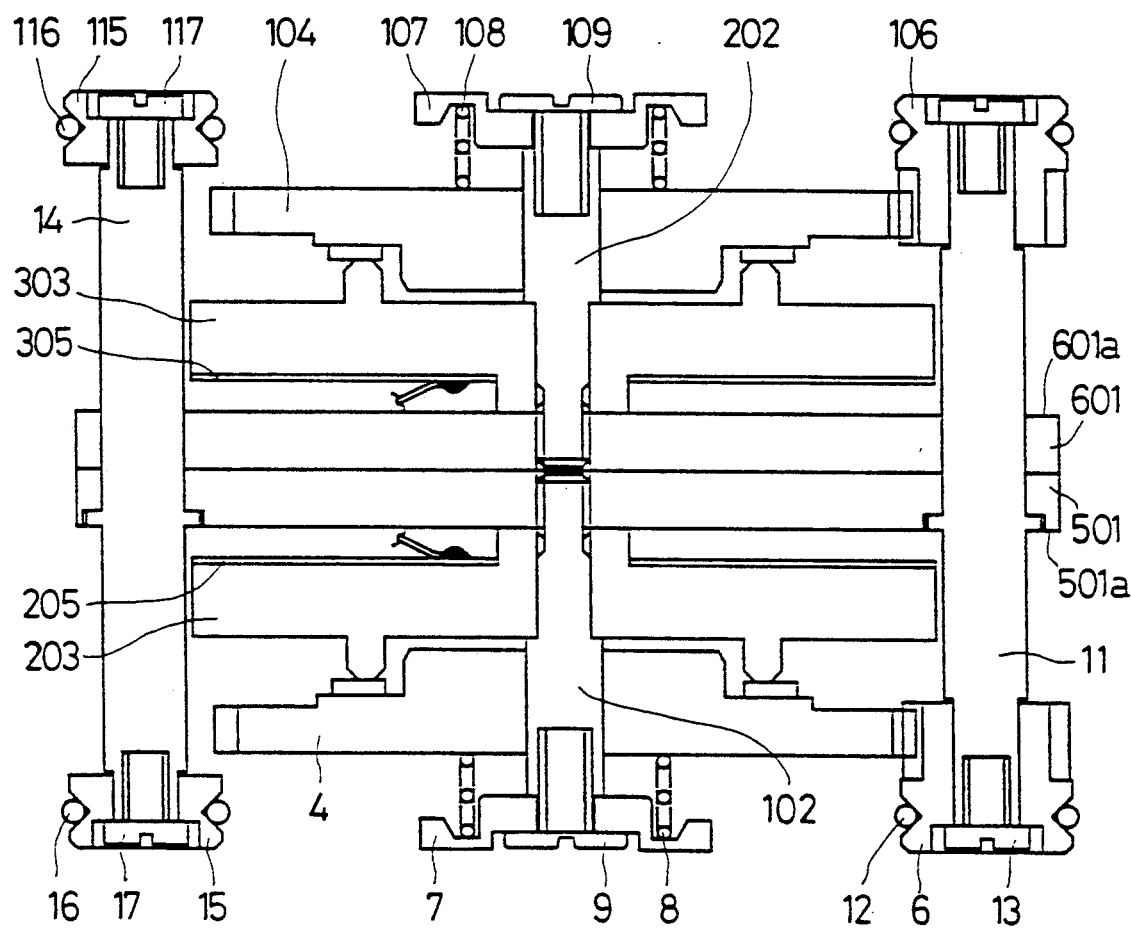
FIG. 15 is a sectional view of a sixth embodiment of a compact travelling mechanism according to the present invention.

In FIG. 15, the sixth embodiment of the invention is shown. The differences between the first and sixth embodiments are the following. A driving axle 11 and a guide axle 14 are fixed at a vibrating member supporting plate 501. On the first side 501a of the vibrating member supporting plate 501, a vibrating member 203 to which a piezoelectric element 205 is attached is held by a motor axle 102 attached to the vibrating member supporting plate 501. A moving member 4 is supported to turn by the motor axle 102. A coil spring 8 guided by the motor axle 102 is inserted between a moving member 4 and a spring hook 7. The spring hook 7 is secured at the motor axle 102 by a hook screw 9.

On the first side 601a of a vibrating member supporting plate 303, a vibrating member 601 to which a piezoelectric element 305 is adhered is held by a motor axle 202 attached to the vibrating member supporting plate 601. A moving member 104 is supported to turn by the motor axle 202. A coil spring 108 guided by the motor axle 202 is inserted between the moving member 104 and a spring hook 107. The hook 107 is secured at the motor axel 202 by a hook screw 109.

As described above, an ultrasonic motor unit structured at the vibrating member supporting plate 601 is fixed between the driving axle 11 and a guide axle 14 and sticks firmly to the vibrating member supporting plate 501. A moving means and other structures are same as those of the first embodiment. The sixth embodiment enables easier assembling disassembling and replacing defective parts. In the structure of this embodiment, two ultrasonic motors are used and driven, respectively. It is possible for the structure to have 4 driving wheels driven, respectively. In the four-wheel structure, four wheels constantly contact the ground to enable stable movement and easier direction change. It is also possible for the structure to have 6 ultrasonic motors.

Figure 17:
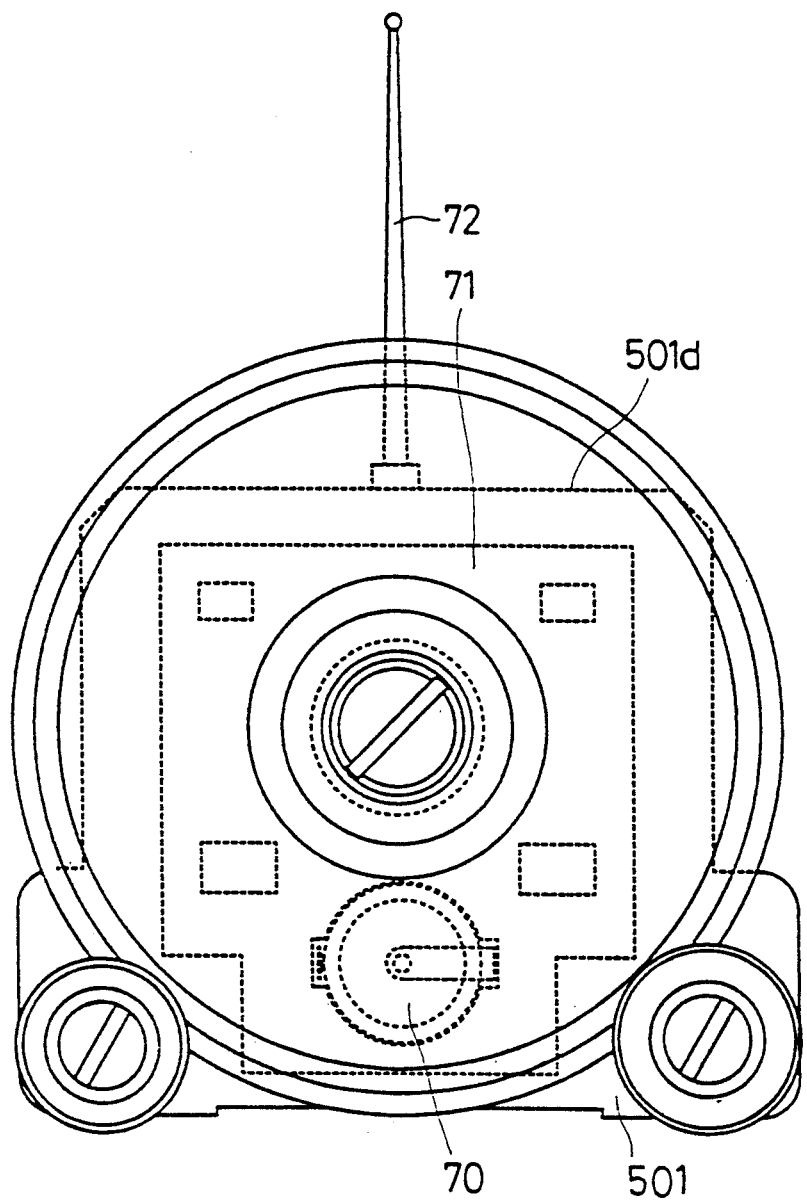
FIG. 17 is a side view of a seventh embodiment of a compact travelling mechanism according to the present invention.
Figure 18:
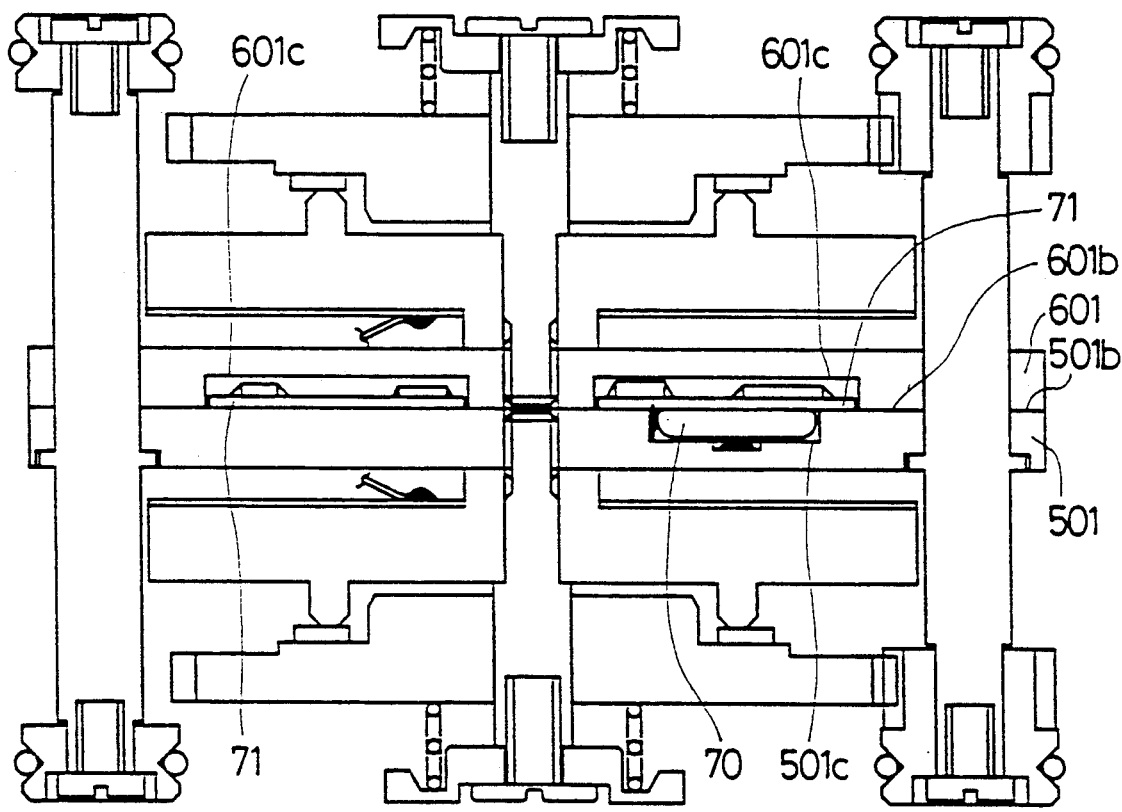
FIG. 18 is a sectional view of the seventh embodiment of a compact travelling mechanism according to the present invention.

In FIG. 17 a side view and FIG. 18 a sectional view, the seventh embodiment of the invention is shown. Structures to support a vibrating member and a moving member, and structures of pressure regulation and movement are the same as the structures shown in FIG. 15, the sixth embodiment, The differences between the sixth and the seventh embodiments are the following. A vibrating member supporting plate 501 has a portion of countersink 501c where a power source 70 is inserted. On the second side 501b of the vibrating member supporting plate 501, a driving circuit 71 is fixed. The power source 70 is electrically connected to the driving circuit 71. The second side 601b of a vibrating member supporting plate 601 has a portion of countersink 601c where the driving circuit 71 is mounted. On the upper side 501d of the vibrating member supporting plate 501, an antenna 71 for wireless communication connected to the driving circuit is fixed. As described above, a compact travelling mechanism carries the power source 70 and the driving circuit 71 inside of which a wireless communication circuit is built in. Signals received by the antenna 72 are amplified and modulated by a receiving circuit (not shown). Output signals from the receiving circuit are transmitted to the driving circuit 71 for controlling the compact traveling mechanism to travel freely in any direction without being connected by wires to a control unit. Moreover each respective movement of a plurality of compact travelling mechanisms of the invention may all be controlled by a central unit.

Figure 16:
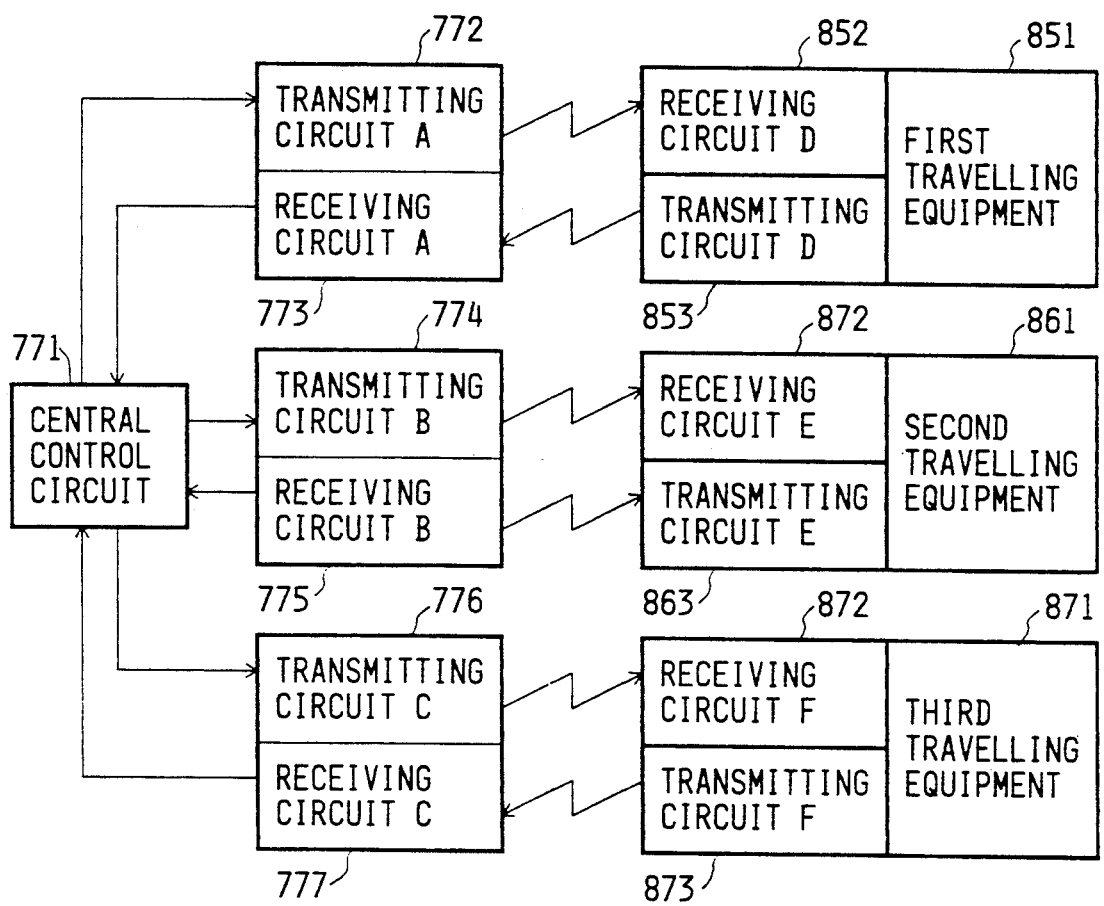
FIG. 16 is a diagram representing central control of a compact travelling mechanism according to the present invention.

As shown in FIG. 16, signals to control movements of compact travelling mechanisms are generated from a central control circuit 771 and sent to three transmitting circuits 772, 774, 776, and information from compact travelling mechanisms is input into three receiving circuits 773, 775 and 777. A signal generated from the receiving circuit A772 is input into a receiving circuit D852 for a first travelling mechanism 851. Then, information on operational condition of the first travelling mechanism 851 is sent from a transmitting circuit D853 to the receiving circuit A773 Similarly, information on a second travelling mechanism 861 is sent from the transmitting circuit B774 to the reciving circuit E862, and then from the transmitting circuit E863 to the receiving circuit B775. In the same way, information on a third travelling mechanism 871 is done. As described above, the central control circuit 771 enables controlling respective movements of a plurality of travelling mechanisms through information flow within the structure.

Figure 19:
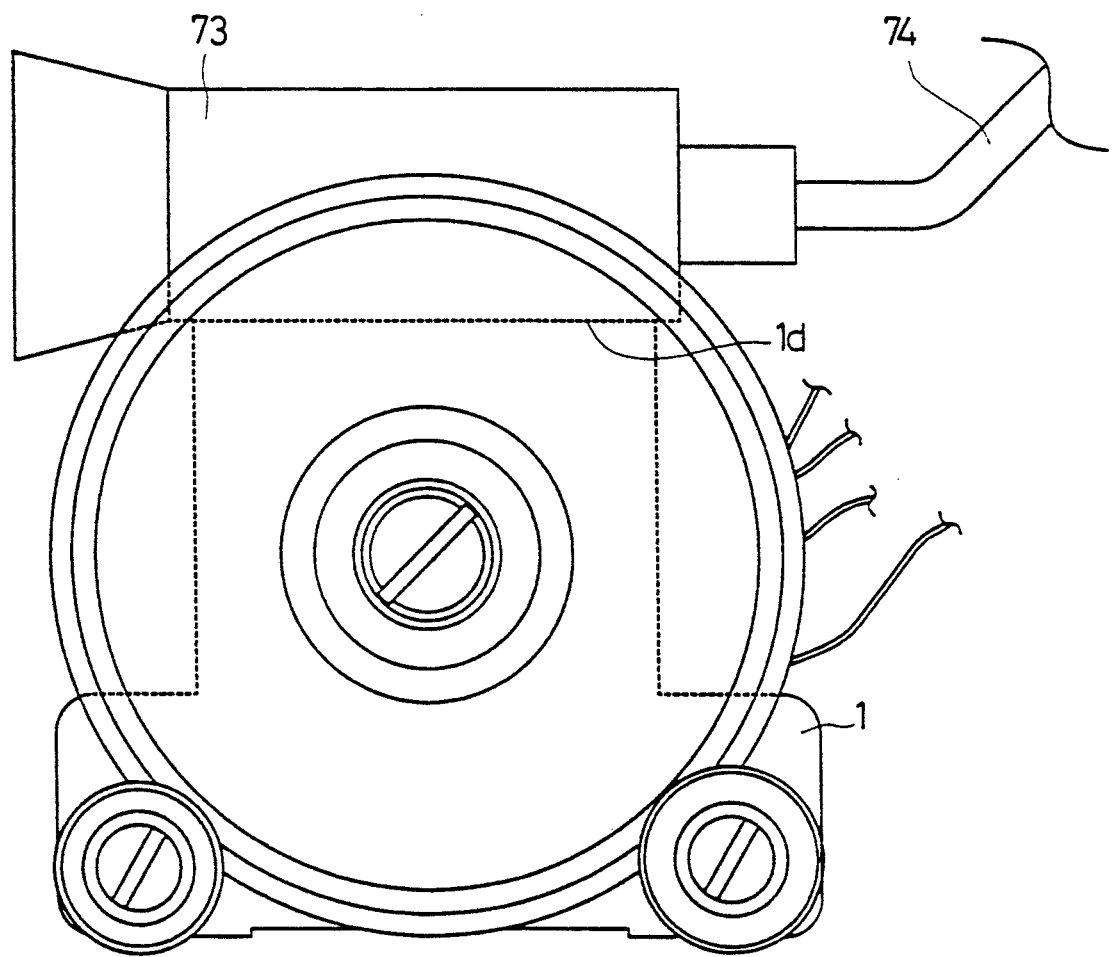
FIG. 19 is a side view of an eighth embodiment of a compact travelling mechanism according to the present invention.

In FIG. 19, a side view, the eighth embodiment of the invention is shown. Structures to support a vibrating member and a moving member, and structures of pressure regulation and movement are the same as the structures shown in FIG. 3, the first embodiment. The differences between the first and the eighth embodiments are the following. On the upper side 1d of a vibrating member supporting plate, a CCD camera 73 is fixed facing a moving direction. Input pictures can be displayed by a monitor (not shown) connected with the CCD camera 73 through a cord 74. This embodiment enables internal inspection for precision instruments, and can be used as a safety arrangement by carrying a sensor for carbon dioxide or other gas.

Furthermore, a compact travelling mechanism carrying a small welding machine or an adhesive supply instrument can be used as a compact finishing machine. Also, a compact travelling mechanism can be used as a carrier. The invention enables the above applications to be realized because an ultrasonic motor used in a compact travelling mechanism is not affected by external magnetic fields and does not need oxygen for operation and has no spark caused by controlling current. Each of two or more ultrasonic motors receives respective signals to travel freely in any direction.

What is claimed is:

1. A traveller for travelling along a surface, comprising:

supporting means for supporting ultrasonic motors;
a first ultrasonic motor supported by the supporting means and comprising a first vibrating member for generating vibration in response to a drive signal applied thereto, a first moving member supported by said first vibrating member, and first pressure regulating means for applying pressure to urge said first vibrating member into contact with said first moving member;

first moving means engageable with a surface on which the traveller is to travel and turned by said first moving member for moving the traveller along the surface;

a second ultrasonic motor supported by the supporting means and comprising a second vibrating member for generating vibration in response to a drive signal applied thereto, a second moving member supported by said second vibrating member, and second pressure regulating means for applying pressure to urge said second vibrating member into contact with said second moving member;

second moving means engageable with the surface and turned by said second moving member for moving the traveller along the surface; and a driving circuit for outputting drive signals to said first vibrating member and said second vibrating member.

2. A traveller according to claim 1; including at least one guide wheel supported by the supporting means for stabilizing contact of the traveller on the surface.

3. A traveller according to claim 1; including inspecting means carried by the traveller for gathering information.

4. A traveller according to claim 1; wherein the first moving means comprises the first moving member engageable directly with the surface; and the second moving means comprises the second moving member engageable directly with the surface.

5. A traveller according to claim 1; wherein the first moving means comprises four driving wheels spaced apart along the circumference of the first moving member and driven by the first moving member, and the second moving means comprises four driving wheels spaced apart along the circumference of the second moving member and driven by the second moving member.

6. A traveller system comprising:

a plurality of travellers each of which comprises supporting means for supporting ultrasonic motors, a first ultrasonic motor supported by the supporting means and comprising a first vibrating member for generating vibration in response to a drive signal applied thereto, a first moving member supported by said first vibrating member, and first pressure regulating means for applying pressure to urge said first vibrating member into contact with said first moving member, first moving means engageable with a surface on which the traveller is to travel and turned by said first moving member for moving the traveller along the surface, a second ultrasonic motor supported by the supporting means and comprising a second vibrating member for generating vibration in response to a drive signal applied thereto, a second moving member supported by said second vibrating member, and second pressure regulating means for applying pressure to urge said second vibrating member into contact with said second moving member, second moving means engageable with the surface and turned by said second moving member for moving the traveller along the surface, and a driving circuit for outputting drive signals to said first vibrating member and said second vibrating member; and controlling means for generating signals to control each of the travellers and for receiving gathered information from the travellers.

7. A traveller system according to claim 6; wherein each of said travellers has communication means including transmitting means for sending said gathered information to said controlling means and receiving means for receiving the signals sent from said controlling means; and said controlling means has transmitting means for sending the signals to said receiving means of said travellers and receiving means for receiving the gathered information sent from said transmitting means of said travellers.

8. A traveller mechanism for travelling along a surface, comprising: a support; first moving means rotatably carried by the support and operative when rotationally driven for moving the mechanism along a surface; second moving means rotatably carried by the support and operative when rotationally driven for moving the mechanism along the surface; a first ultrasonic motor carried by the support for driving the first moving means, the first ultrasonic motor comprising a first vibratory member excitable into a prescribed mode of vibration in response to a driving signal applied thereto, a first movable member rotatably carried by the support in opposed relation to the first vibratory member, and first means for converting vibration of the first vibratory member in the prescribed mode to rotation of the first movable member; first means for transmitting rotation of the first movable member to the first moving means to rotationally drive the first moving means to thereby move the mechanism; a second ultrasonic motor carried by the support for driving the second moving means, the second ultrasonic motor comprising a second vibratory member excitable into a prescribed mode of vibration in response to a driving signal applied thereto, a second movable member rotatably carried by the support in opposed relation to the second vibratory member, and second means for converting vibration of the second vibratory member in the prescribed mode to rotation of the second movable member; second means for transmitting rotation of the second movable member to the second moving means to rotationally drive the second moving means to thereby move the mechanism; and driving circuit means for applying drive signals to the first and second vibratory members to independently control the driving of the first and second moving means to thereby control the movement of the mechanism along the surface.

9. A traveller mechanism according to claim 8; wherein the first and second moving means are positioned on opposite sides of the support with respect to a center line thereof.

10. A traveller mechanism according to claim 9; wherein the support has a front end and a rear end, the first and second moving means being disposed at the forward end of the support.

11. A traveller mechanism according to claim 9; wherein the first moving means comprises a plurality of first driving wheels disposed in circumferentially spaced relation around the first movable member, and the first means for transmitting comprises means for transmitting rotation of the first movable member to each of the first driving wheels; and the second moving means comprises a plurality of second driving wheels disposed in circumferentially spaced relation around the second movable member, and the second means for transmitting comprises means for transmitting rotation of the second movable member to each of the second driving wheels.

12. A traveller mechanism according to claim 11; wherein the first and second driving wheels all lie in a common plane.

13. A traveller mechanism according to claim 11; wherein the pluralities of driving wheels comprise four first driving wheels and four second driving wheels.

14. A traveller mechanism according to claim 13; including four drive axles each having opposite ends, each axle rotatably supporting a first driving wheel at one end thereof and a second driving wheel at the other end thereof.

15. A traveller mechanism according to claim 11; wherein the support has a front end and a rear end, and the first and second driving wheels are arranged on the support such that when the mechanism is in a normal orientation, one set of driving wheels contacts the surface, and when the mechanism is orientated forwardly or rearwardly a predetermined angular amount from the normal orientation, another set of driving wheels contacts the surface.

16. A traveller mechanism according to claim 15; wherein each set has four driving wheels.

17. A traveller mechanism according to claim 8; wherein the support has a front end and a rear end, the first and second moving means being disposed at the rear end of the support.

18. A traveller mechanism according to claim 17; including at least one guiding means rotatably carried by the support at the front end thereof for guiding movement of the mechanism on the surface.

19. A traveller mechanism according to claim 18; wherein the at least one guiding means comprises one guiding means positioned at the center of the support at the front end thereof.

20. A traveller mechanism according to claim 17; including third and fourth moving means rotatably carried by the support and operative when rotationally driven for moving the mechanism on the surface, the third moving means being positioned at the front of the support on the same side thereof as the first moving means and the fourth moving means being positioned at the front of the support on the same side thereof as the second moving means; means for transmitting rotation of the first movable member to both the first and third moving means to rotationally drive the same; and means for transmitting rotation of the second movable member to both the second and fourth moving means to rotationally drive the same.

21. A traveller mechanism according to claim wherein the first, second, third and fourth moving means lie in the same plane; and further including another second, third and fourth moving means lying in another plane and being rotationally driven by the first and second members.

22. A traveller mechanism according to claim 8; wherein the first and second ultrasonic motors comprise a non-rotatable motor axle carried by the support, the first and second vibratory members being non-rotatably mounted on and secured to the motor axle, and the first and second movable members being rotatably mounted on the motor axle to undergo rotation independently of one another.

23. A traveller mechanism according to claim 22; wherein the first and second means for converting include first pressure applying means for urging the first vibratory member and first movable member into pressure contact with each other at an adjustably settable pressure, and second pressure applying means for urging the second vibratory member and second movable member into pressure contact with each other at an adjustably settable pressure.

24. A traveller mechanism according to claim 8; wherein the driving circuit means includes a wireless communication circuit for receiving broadcast control signals to control the movement of the mechanism and for processing the control signals to produce corresponding drive signals.

25. A traveller mechanism according to claim 24; including information gathering means carried by the mechanism for gathering information; and the wireless communication circuit includes means for sending the gathered information by wireless transmission.

26. A remote-controlled traveller for travelling along a surface, comprising: a frame having front and rear ends and having a front-to-rear center line; a plurality of wheels rotatably mounted on the frame, at least two of thee wheels being disposed at one end of the frame on opposite sides of the center line and at least one of the wheels being disposed at the other end of the frame; a pair of ultrasonic rotary motors mounted side-by-side on the frame for independently rotationally driving the two wheels at the one end of the frame to effect movement of the traveller along a surface; and remote control means for remotely controlling the speed and direction of rotation of each ultrasonic motor independently of the other to thereby control the movement of the traveller along the surface.

27. A remote-controlled traveller according to claim 26; including means defining a communication link between the remote control means and the ultrasonic motors to enable the remote control means to send control signals to the ultrasonic motors.

28. A remote-controlled traveller according to claim 27; wherein the communication link comprises a wire communication link.

29. A remote-controlled traveller according to claim 27; wherein the communication link comprises a wireless communication link.

30. A remote-controlled traveller according to claim 26; wherein each ultrasonic motor comprises a vibratory member vibratable in a prescribed mode of vibration, and a rotatably mounted movable member in pressure contact with the vibratory member so as to be rotationally driven in response to vibration of the vibratory member.

31. A remote-controlled traveller according to claim 30; wherein the pair of ultrasonic motors includes a common, non-rotatable motor axle, the vibratory member of each motor being non-rotatably mounted on and secured to the common motor axle, and the movable member of each motor being rotatably mounted on the common motor axle to undergo rotation independently of each other.

32. A remote-controlled traveller according to claim 26; wherein the plurality of wheels comprises two front wheels and two rear wheels each of which is rotationally driven by one of the pair of ultrasonic motors.

33. A remote-controlled traveller according to claim 26; wherein the plurality of wheels comprises eight wheels each of which is rotationally driven by one of the pair of ultrasonic motors.

* * * * *